(12) United States Patent
Eisner et al.

(10) Patent No.: US 11,730,182 B2
(45) Date of Patent: Aug. 22, 2023

(54) EMULSION WITH LUPINE PROTEIN

(71) Applicant: Prolupin GmbH, Grimmen (DE)

(72) Inventors: Peter Eisner, Freising (DE); Regina Fischl, Freising (DE); Stephanie Mittermaier, Moosburg (DE); Christian Zacherl, Freising (DE); Simone Toelstede, Munich (DE); Dorothee Jacobs, Freising (DE); Klaus Schreiber, Freising (DE); Andrea Hickisch, Munich (DE)

(73) Assignee: Prolupin GmbH, Grimmen (DE)

( * ) Notice: Subject to any disclaimer, the term of this patent is extended or adjusted under 35 U.S.C. 154(b) by 4 days.

(21) Appl. No.: 15/389,635

(22) Filed: Dec. 23, 2016

(65) Prior Publication Data
US 2017/0105441 A1 Apr. 20, 2017

Related U.S. Application Data

(63) Continuation of application No. PCT/EP2015/063273, filed on Jun. 15, 2015.

(30) Foreign Application Priority Data

Jun. 30, 2014 (DE) ............ 10 2014 009 676.9

(51) Int. Cl.
*A23L 29/10* (2016.01)
*A23L 9/10* (2016.01)
(Continued)

(52) U.S. Cl.
CPC ............ *A23L 29/10* (2016.08); *A23C 11/106* (2013.01); *A23C 20/025* (2013.01); *A23C 23/00* (2013.01);
(Continued)

(58) Field of Classification Search
CPC .......... A23L 29/10; A23L 9/12; A23L 33/185; A23C 11/103; A23C 11/106; A23C 20/025; A23C 23/00; A23V 2002/00
(Continued)

(56) References Cited

U.S. PATENT DOCUMENTS

2006/0099301 A1 5/2006 Funda et al.
2006/0127560 A1 6/2006 Back et al.
(Continued)

FOREIGN PATENT DOCUMENTS

CN 1747739 A 3/2006
CN 102458139 A 5/2012
(Continued)

OTHER PUBLICATIONS

Duranti et al. Trends in Food Science & Technology 19 (2008) 624-633 (Year: 2008).*

(Continued)

*Primary Examiner* — Subbalakshmi Prakash
(74) *Attorney, Agent, or Firm* — Jason H. Vick; Sheridan Ross, PC

(57) ABSTRACT

The present invention relates to an emulsion which contains at least lupine protein and plant fat emulsified in water, and a method for the production of the emulsion. The emulsion is characterized in that the lupine protein comprises a mass fraction in the emulsion which is <3%. The proposed emulsion gives an impression regarding the rheological properties, color, smell and taste, which is comparable to such of cow milk and can be further processed into various neutral milk substitute products.

12 Claims, 2 Drawing Sheets

(51) Int. Cl.
  *A23L 33/185*  (2016.01)
  *A23C 20/02*   (2021.01)
  *A23C 11/10*   (2021.01)
  *A23L 11/60*   (2021.01)
  *A23C 23/00*   (2006.01)

(52) U.S. Cl.
  CPC ............... *A23L 9/12* (2016.08); *A23L 11/60* (2021.01); *A23L 33/185* (2016.08); *A23V 2002/00* (2013.01)

(58) Field of Classification Search
  USPC ......................................................... 426/549
  See application file for complete search history.

(56) References Cited

U.S. PATENT DOCUMENTS

| | | | |
|---|---|---|---|
| 2008/0089990 | A1 | 4/2008 | Eisner et al. |
| 2010/0092654 | A1 | 4/2010 | Müller et al. |
| 2012/0135125 | A1* | 5/2012 | Muschiolik .......... A23C 9/1307 426/602 |

FOREIGN PATENT DOCUMENTS

| | | |
|---|---|---|
| DE | 348755 C | 2/1922 |
| DE | 19640992 A1 | 4/1997 |
| EP | 0449396 A1 | 10/1991 |
| EP | 1405572 A1 | 4/2004 |
| WO | WO 2004/034806 A1 | 4/2004 |
| WO | WO 2004/071521 | 8/2004 |
| WO | WO 2004/093560 A1 | 11/2004 |
| WO | WO 2006/003110 A1 | 1/2006 |
| WO | WO 2006/076889 A2 | 7/2006 |
| WO | WO 2008/089734 A1 | 7/2008 |
| WO | WO 2008/118129 A1 | 10/2008 |
| WO | WO 2010/124870 A1 | 11/2010 |
| WO | WO-2010127414 A1 * | 11/2010 ................ A23J 3/14 |

OTHER PUBLICATIONS

Lqari, H. et al. "*Lupinus angustifolius* Protein Isolates: Chemical Composition, Functional Properties and Protein Characterization" Food Chemistry 76; 2002; pp. 349-356.

Papalamprou, Evdoxia et al. "Effect of Medium Molecular Weight Xanthan Gum in Rheology and Stability of Oil-In-Water Emulsion Stabilized with Legume Proteins" Journal of the Science of Food and Agriculture; 85; 2005; pp. 1967-1973.

Popov-Raljic, Jovanka V., et al. "Color Changes of UHT Milk During Storage" Sensors, vol. 8; 2008, pp. 5961-5974.

Sosulski, F.W. et al. "Legume-Based Imitation and Blended Milk Products" Canadian Institute of Food Science and Technology Journal; vol. 11, No. 3, Jul. 1978, pp. 117-123.

International Search Report for International Application No. PCT/EP2015/063273, dated Aug. 5, 2015.

Written Opinion for International Application No. PCT/EP2015/063273, dated Aug. 5, 2015.

International Preliminary Report on Patentability for International Application No. PCT/EP2015/063273, dated Jan. 12, 2017.

Office Action (Including Translation) for corresponding Chinese Patent Application No. 201580036259.4, dated Jun. 5, 2020.

* cited by examiner

EMULSION WITH LUPINE PROTEIN

CROSS REFERENCE TO RELATED APPLICATIONS

This application is a continuation of co-pending international patent application PCT/EP 2015/063273 filed on 15 Jun. 2015 and designating the U.S., which was published in German, and claims priority from German patent application DE 10 2014 009 679.9 filed on 30 Jun. 2014. The entire contents of these prior applications are incorporated herein by reference.

FIELD OF THE INVENTION

The present invention relates to an emulsion which contains at least lupine protein and plant fat emulsified in water, and a method for the production of the emulsion. Such an emulsion can be further processed into food products such as lupine pudding, lupine yoghurt or lupine fresh cheese.

DELATED PRIOR ART

Known are, for example, emulsions such as soya or oat milk which were produced from whole seeds or raw material. For this propose, for example, soya beans are ground in water and the contained fat is emulsified with the protein. Subsequently, insoluble constituencies are separated by centrifugation. The resulting emulsion can be used as a milk substitute product.

A similar method for lupine seeds is described in EP 0449396 A1. Here, the lupine seeds are pre-swollen and the resulting "slurry", which is possibly added with further water, is pressed off at room temperature to obtain an emulsion of lupine protein and fat. Due to secondary plant substances and fat oxidation products contained in the seeds these emulsions have a typical plant flavor and taste impression and are therefore refused by many consumers. These emulsions also have a very yellow color, which differs significantly from cow milk, which is caused by the fat contained in the lupines.

WO 2008/118129 A1 describes a basic substance for drinks made of lupine seeds. In addition to the above mentioned steps a heating step of the suspension at 85° C. for 20 minutes and subsequent high temperature heating by steam injection at 140° C. for 2 seconds is carried out in one of the described embodiments in order to reduce the beany "off-flavors" and to increase the shelf life. Due to the fact, that this method contains seed owned fat, that contains an increased content of unsaturated fatty acids, it is thermally damaged by the heating step. This results in fat oxidation products and trans fatty acids which might again lead to significant negative impressions of flavor. Moreover, it is shown by experiments where the method of WO 2008/118129 A1 was used, that the lupine proteins are precipitated out of the solution when the temperature is raised to above 90° C.

WO 2004/093560 A1 describes the production of a protein enriched basic mixture of lupine seeds which were obtained from non-deoiled lupine flour by alkaline extraction, subsequent precipitation and solubilisation of the protein. By diluting and additions such as fat, sugar or coloring ingredients a kind of lupine milk is produced from which in turn further products can be developed. In experiments with this method it is shown that the so obtained "lupine milk" has a yellowish color and is perceived in a sensory evaluation as intensive "beany" and "grassy" impressions of flavor. The resulting products have hardly any optical as well as tasty similarities with conventional milk products.

In the methods mentioned so far full fat and none pretreated lupine seeds are used as raw materials for the production of milk or a corresponding basis for further food production. They have, beside the mentioned negative sensory input, the further disadvantage that seed-owned anti-nutritive water-soluble components (such as oligosaccharides, bitter agents) and fat soluble and/or amphiphilic components of the lupine seeds which adhere to the fatty phase are transferred into the corresponding products manufactured therefrom.

For the reduction of the disturbing flavor and taste in lupine protein products which do not contain lupine oils, further methods are described. Besides the fermentation e.g. described in WO 2004/034806 A1, these are thermal methods for improving the taste of lupine protein, frequently in combination with the addition of sugars as described for example in WO 2008/089734 A1. However, the proteins denature at least partially at temperatures of above 95° C. and loose a part of their functional properties. Especially the very well-emulsifying globulins of the lupines are sensitive to high temperatures and loose their well-emulsifying properties after the thermal treatment. They agglomerate in aqueous suspensions or solutions at temperatures of above 95° C., are deposited as particles and are thus no longer available as emulsifiers. As a result, sophisticated emulsions such as milk, pudding, yoghurt and cheese can not be produced stably with thermally pretreated lupine proteins.

Thus, it is not yet possible to produce stable emulsions of lupine proteins which are sensorially similar to cow milk and on the basis of which it becomes possible to produce milk substitute products.

SUMMARY OF THE INVENTION

The object of the present invention is to provide a stable emulsion with lupine protein (lupine milk) as well as a method for the production, wherein, regarding the rheological properties, the color and the smell and taste, the emulsion can cause an impression comparable to cow milk and on the basis of which it is possible to prepare various sensorially neutral milk replacement products.

The objective is achieved by the emulsion and the method according to claims 1 and 16. Advantageous embodiments of the emulsion and the method are the subject of the dependent claims or can be inferred from the following description as well as from the embodiments.

The emulsion according to the invention is characterized in a significantly reduced protein content (mass fraction) in comparison to conventional milk substitute products of less than 3%, preferably less than 2.5%, particularly preferred less than or equal to 1.8%. Despite the low protein content the emulsion according to the invention can comprise a fat content (mass fraction) which is comparable or higher to conventional milk substitute products. It is preferably greater than 3%, particularly preferably greater than or equal to 4%. Due to the increased fat content which can be easily adjusted by the addition of plant fat, the mouth feel of the emulsion is also improved and the viscosity is raised to a range of between 1 to 10 mPas at 20° C. Thereby, no lupine fat is used as plant fat. In an exemplary embodiment the emulsion according to the invention which is consisting of water with 1.8% lupine protein and 4% plant fat has a viscosity of 2 mPas at 20° C. This corresponds to the viscosity of cow milk.

In the present patent application, the term plant fat comprises solid as well as liquid fats (fatty oils). In the following the liquid plant fats are in parts also referred to as plant oils.

The emulsion is particularly suitable for the use as a basis of milk substitute products. In the absence of the use of lupine fats and the lower content of lupine protein, the emulsion according to the invention can be provided with a white color, a milk-like viscosity and a neutral taste and flavor. The emulsion remains stable even after heating above 95° C. It is of particularly preference to heat it up to temperatures of above 120° C. and it does not or only slightly change its homogeneous physical properties during the storage.

The ratio of fat mass to protein mass in the emulsion according to the invention is preferably greater than 1, advantageously greater than 2, particularly preferred greater than 2.2. In addition, the fat is very finely dispersed in the emulsion according to the invention after a corresponding comminution. The fat particles in the emulsion preferably comprise a D90 particle size (90% of the number of fat particles have a diameter smaller than the indicated size) of less than 5 $\mu$m, preferably less than 3 $\mu$m, particularly preferably less than 2 $\mu$m. Surprisingly the emulsion remains stable despite the low protein content with regard to the large surface area of the fat particles which is available for this particle size, and does not change its stability even after a thermal treatment. Likewise, the inventors have found that the emulsion already has a relatively neutral flavor and taste profile without a thermal pretreatment of the protein after the comminution of the fat particles. Obviously with this large surface amphiphilic disturbing flavors from the lupine proteins attach well to the fat particles/droplets and for a retro-nasal sensory perception they are not released in the same way as for larger particles or higher protein contents.

In the proposed method for producing the emulsion the comminution of the fat particles/droplets is preferably carried out at temperatures of above 30° C., more preferably of above 45° C. It is preferably carried out by means of a homogenizer at pressures of above $200*10^3$ hPa (200 bar). Following the comminution, the emulsion is preferably heated to a temperature of above 95° C., preferably above 110° C., particularly preferably above 120° C. This heating results in a further positive change in taste and flavor impression of the lupine protein which is desired in most applications and contributes to a milk-like sensoric impression of the emulsion. Despite the high temperatures the emulsion according to the invention remains stable after heating and subsequent cooling, even if after heating, unlike in other applications, no homogenization step takes place.

For the consumption of the emulsion according to the invention, for example as a drink or as basic substance for products such as yoghurt, pudding or fresh cheese, further ingredients are added such as for example sugars and/or flavors and/or viscosity influencing carbohydrates and/or acid-regulating phosphates and/or minerals and/or vitamins. To simplify the technological process it is advantageous to add the said ingredients to the emulsion before the homogenizing and heating take place.

It is found that the emulsion remains stable for a particularly long time, if for a use of an amount of less than 3% by mass of lupine protein in the emulsion, the proportion of alpha and beta conglutine in the added protein is particularly high and the proportion of gamma conglutine is correspondingly low. This can be procedurally achieved in the extraction of the lupine protein, for example by precipitating the alpha and beta conglutines from a protein solution obtained in neutral or slightly alkaline. However, 5 to 10% by mass of gamma conglutine remains in the precipitated protein. For the depletion of gamma conglutine it is particularly preferred to perform an acidic pre-extraction of the lupine raw materials (flakes, semolina or flour) before the protein extraction, in which gamma conglutine is separated. Therewith, it is possible to reduce the amounts of gamma conglutine in the lupine protein by more than half to 2.5% by mass or less and thus to increase the percentage of alpha and beta conglutine in the emulsion.

The acidic pre-extraction is particularly preferred if carried out near to the isoelectronic point of the lupine globulin, which varies between pH 4.3 and 4.7 for diverse lupine species. The content of alpha and beta conglutine can be further increased if the acidic pre-extraction is carried out more than once and after the extraction the extracts are separated from the raffinates by solid liquid separation methods. As an example, DE 19640992 A1 describes how to carry out such a combined acidic and alkaline extraction according to the prior art in a preferred manner.

A further possibility to increase the amounts of alpha and beta conglutine and to reduce the gamma conglutine in the lupine protein can be achieved by a double protein extraction in counter flow. Here, the raffinate from the protein extraction is undergoing a repeated extraction at a pH value of 6.5 and 8.0 at the same or similar pH value. The extract of the second extraction of the raffinate is then used in the first protein extraction of the next raw material. Only after the second extraction the extract is removed from the system and the protein is concentrated, e.g. by precipitation. By this counter flow process the amounts of alpha and beta conglutine in the precipitated protein is also increased.

Depending on the application and further processing of the emulsion the focus of the processing can be put on the sensory qualities or the techno functionality of the produced emulsion. Thus, emulsion which is even more neutral with respect to sensory qualities is obtained when the lupine protein is dried before processing into the emulsion according to the invention. By this step many volatile flavors are separated with the water phase from the protein. However, a higher functionality of the lupine protein is achieved if the protein is not dried before a use in the emulsion according to the invention and it is processed in moist form. Thus, it may be advantageously to use the moist protein from the extraction and precipitation, solved or suspended in water, for the production of the emulsion because by this measure the protein content can be further reduced in the emulsion according to the invention, however the same emulsifying properties are maintained. The protein water suspension can be present either in liquid-pasty form or as a solid in frozen form.

A further sensory improvement of the emulsion according to the invention can be achieved if the lupine seeds are subjected to a treatment with super critical $CO_2$ or ethanol before the protein is separated. Herewith, considerable amounts of carotenoids are separated from the raw material so that a tendency to yellow color of emulsion according to the invention is suppressed and a milk-like color is obtained. A color comparison of the emulsion according to the invention (lupine milk), which was obtained from the lupine protein which had been subjected to $CO_2$ treatment prior to the extraction, with a lupine milk according to WO 2004/093560 A1, which was extracted from full-fatty lupine raw materials, clearly shows the milk-like white color of the emulsion according to the invention compared with the yellow control emulsion.

It is of particular preference if the emulsion according to the invention has a pH value of greater than 6.5 and particularly preferred of greater than 7.5. In this case and with a simultaneous presence of phosphates and other stabilizer in the emulsion it is possible to avoid a flocculation of the lupine protein even when the emulsion is added to hot and acid drinks (e.g. coffee) and to achieve a full-bodied flavor profile.

In the following the emulsion according to the invention and the related method are explained by the way of example with reference to the embodiments in conjunction with the figures.

DESCRIPTION OF PREFERRED EMBODIMENTS

Figure 1:
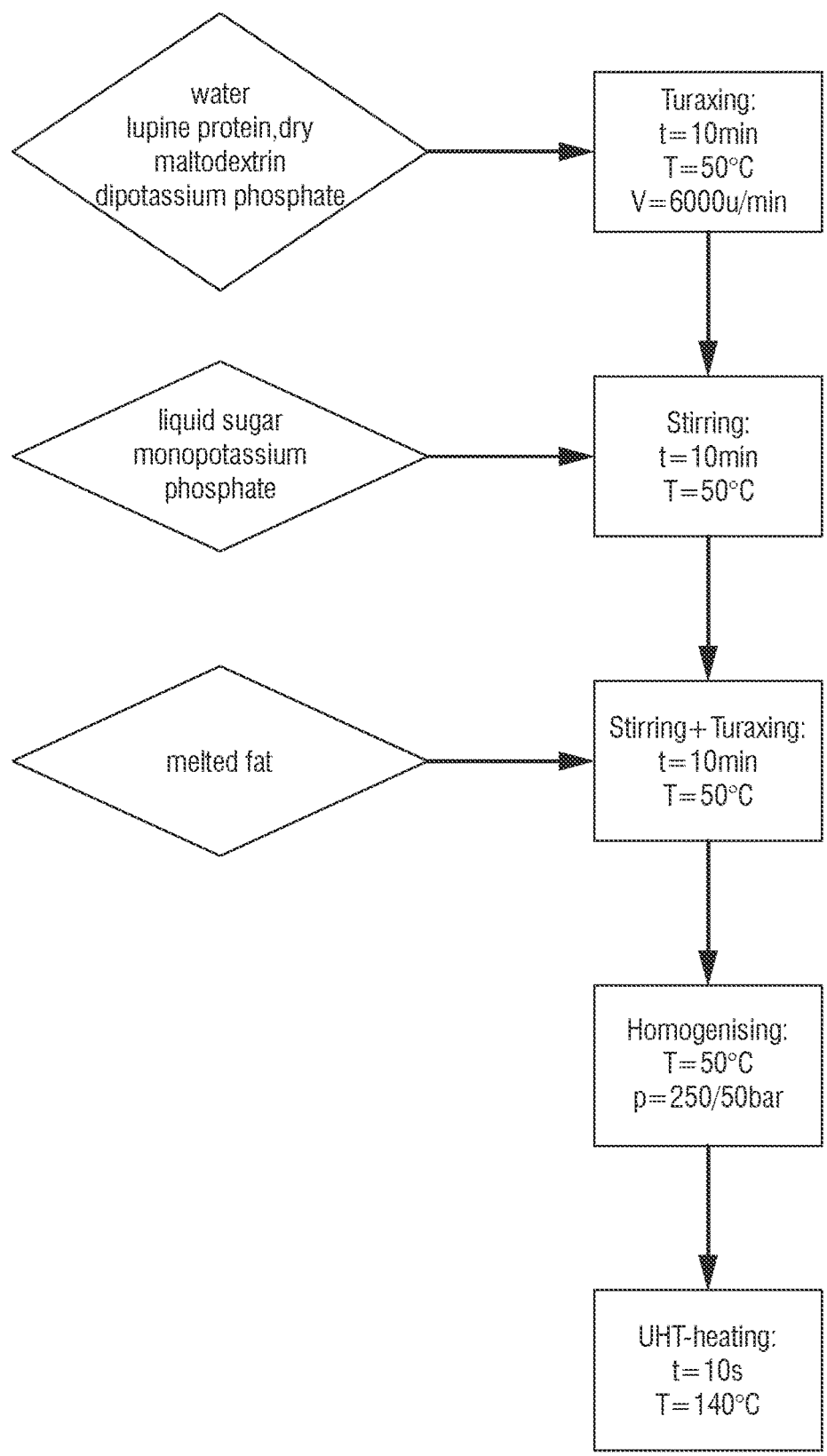
FIG. 1 shows a first example of the process sequence in the proposed method.

In the example of FIG. 1 for the production of the emulsion according to the invention first lupine protein extracted from lupine seeds and subsequently spray dried are mixed with maltodextrin, dipotassium phosphate and water. The mixing is carried out with a dispersing unit, for example with a Turrax® with V=6000 u/min, at a temperature of T=50° C. for t=10 min. Subsequently, liquid sugar and monopotassium phosphate are added to the mixture and stirred for t=10 min at T=50° C. In the next step the addition of molten fat is carried out which is also stirred at T=50° C. for t=10 min and mixed well with the existing mixture by means of the dispersing unit. This is followed by a homogenization step at T=50° C. and a pressure p of p=250/50*10$^3$ hPa (250/50 bar). Finally, the emulsion is ultra-heated to a temperature of T=140° C. for t=10 s.

Figure 2:
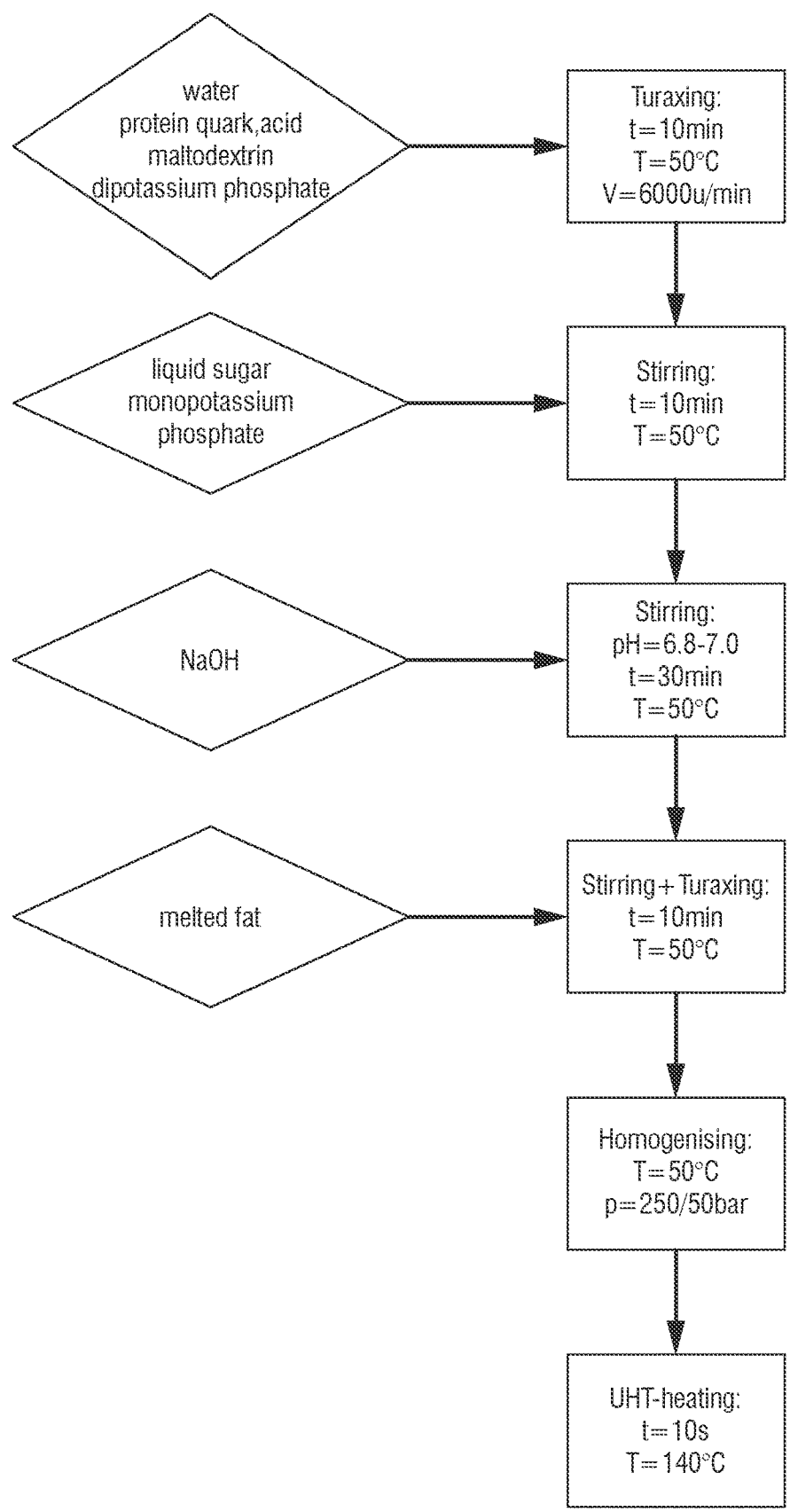
FIG. 2 shows a second example of the process sequence in the proposed method.

In the example of FIG. 2 for the production of the emulsion according to the invention a lupine protein extracted from lupine seeds in a still moist form, i.e. as an acidic protein quark, is mixed with maltodextrin, dipotassium phosphate and water. The mixing is also carried out with a Turrax® with V=6000 u/min and at a temperature of T=50° C. for t=10 min. Subsequently, liquid sugar and monopotassium phosphate are added to the mixture and stirred for t=10 min at T=50° C. To neutralize the acidic pH value of the mixture caused by the acidic protein quark, sodium hydroxide is then added and stirred at T=50° C. for t=30 min. The amount of sodium hydroxide is chosen such that a pH value of 6.8 to 7.0 of the mixture is achieved. In the next step the molten fat is added which is likewise stirred at T=50° C. for t=10 min and mixed well with the existing mixture by means of the Turrax. This is followed by a homogenization step at T=50° C. and a pressure p of p=250/50*10$^3$ hPa (250/50 bar). Finally, the emulsion is ultra-heated to a temperature of T=140° C. for t=10 s.

The added amounts of lupine protein and fat are selected such that in the present example a mass fraction of the protein in the emulsion of 1.8% and a mass fraction of the fat of 4% are achieved. In the case of the proposed method pure lupine protein, i.e. protein without amounts of lupine fat, was used for the production of the emulsion. For example, palm fat or coconut oil are added as fats.

The following table shows an exemplary composition of the emulsion according to the invention:

| Ingredients | Amount % by mass |
| --- | --- |
| Protein | 1.8 |
| Fat | 4 |
| Sugar | 1 |
| Maltodextrin | 4.5 |
| Minerals | 1 |
| Water | >87 |

Although the prepared emulsion comprises carotenoid containing lupine proteins it has an almost white color. Their L*-value (definition see L*a*b* color space) is greater than or equal to 88, in comparison with cow milk which has an L*-value of about 90. Contrary to cow milk imperceptible ΔE color distances of 1-2 are achieved. Thus, ΔE color distances of soya milk (L*-value between 50 up to 80) to cow milk are frequently above 5, wherein a color distance of this magnitude being evaluated as a different color in the literature (compare Popov-Raljic et al., 2008 Color Change of UHT Milk During Storage. Sensors Vol: 8(9)).

The emulsion according to the invention has an amazing stability over many days with a fat to protein ratio of 2 after heating to >110° C. and during the subsequent storage despite a low viscosity of less than 10 mPas. Surprisingly, no or only small fractions of solid do separate in the emulsion after storage for 10 days to 8 weeks even if only lupine proteins are used as emulsifiers. Experiments with this emulsion showed that even after heating to a temperature of 140° C. it was hardly to detect a separation of fat or protein during storage for 10 days. Thus, the amount of deposited solids from the emulsion according to the invention was less than 10% of the solid contained in the emulsion. In some cases the deposited solid was below 2% after storage for 10 days at 4° C. Comparative results were also obtained with a storage of 8 weeks.

In addition to the described lupine milk as an embodiment of the emulsion according to the invention it is possible by further processing to obtain a multiplicity of tasty milk substitute products from the emulsion. In the following a few examples are shown.

Lupine Vanilla Pudding:

| Ingredients | [%] |
| --- | --- |
| Lupine milk | 87 |
| Starch | 6 |
| Sugar | 7 |

For the production of pudding from lupine milk corn starch and sugar were mixed. In addition, to achieve a specific taste for example cacao powder or flavors can be added. To obtain a more creamy texture, to obtain a more yellowish color or to increase the protein content lupine protein isolate can furthermore be added to the dry mixture of corn starch and sugar.

The emulsion or lupine milk was boiled, then taken from the cooking side and the starch mixture was stirred in. Subsequently, the mass was further boiled with stirring for one minute and it was bottled. A further variant for the production of lupine pudding was made directly with the individual ingredients which are contained in the lupine milk, together with the other ingredients which are additionally used in the pudding. But again it was also necessary to heat the mixture to a temperature above 95° C. and to comminute the fat particles by intensive stirring in order to achieve the desired sensory effects.

Lupine Yoghurt:

The emulsion according to the invention can be used for the production of yoghurt-like products. The sugar, fat and protein content of the milk can be adapted accordingly (dry substance: 10-18%). For the addition of further ingredients the milk can be reheated if the components are more soluble in the heat. The lupine milk (20-45° C.) is then inoculated with lactic acid bacteria and fermented until reaching a pH of 4.3±0.2 at 30-40° C. A cooling phase of 24 h at 1-4° C. is then carried out. During the fermentation and the cooling phase the yoghurt is stored, possibly free of movement. Both set-firm and stirred yoghurts can thus be produced. The stirred yoghurt is additionally stirred after the cooling phase and additionally added with fruit preparations or flavors.

Production of Lupine Fresh Cheese:

The emulsion according to the invention can also used for the production of fresh cheese-like products. The dry substance content of the milk can preferably be increased by the addition of fat or protein. In addition thickening agents or viscosity increasing substances (e.g. citrus fibers) as well as minerals can be added to improve the mouth feel and the sensory of the fresh cheese. For the production of fresh cheese the lupine milk according to the invention is inoculated with lactic acid cultures at 20-45° C. and fermented at 30° C.-40° C. until reaching a pH of <4.5. Subsequently, the resulting whey is separated from the so called break (coagulated emulsion). The resulting fresh cheese-like product is bottled, optionally mixed with flavor and spices or further stabilizers, if necessary treated again with heat and then stored at temperatures of between 1 and 6° C.

The fresh cheese-like product can be additionally mixed with further cultures (e.g. molds) and matured for several days to weeks. By the maturation, hard, soft or hard cheese-like products can be produced.

Therefore; what is claimed, is:

1. A lupine protein emulsion comprising lupine protein and plant fat emulsified in water,
wherein
the lupine protein comprises a mass fraction in the emulsion which is <3%, and
a mass fraction in the lupine protein of alpha and beta conglutine is ≥80% and a mass fraction of gamma conglutine is between 1 and 10%, wherein said lupine protein emulsion is prepared by mixing the lupine protein with water and plant fat, and wherein after the mixing process the lupine protein emulsion is heated to a temperature of >95° C. and then cooled down, wherein an amount of deposited solids from the resulting lupine protein emulsion is less than 10% of the solid contained in the emulsion after storage for 10 days at 4° C.

2. The emulsion of claim 1,
wherein
a mass fraction in the lupine protein of gamma conglutine is ≤2.5%.

3. The emulsion of claim 1,
wherein
the emulsion comprises no lupine fat or a mass fraction of lupine fat of below 0.2% in the emulsion.

4. The emulsion of claim 1,
wherein
the plant fat is a refined fat.

5. The emulsion of claim 4,
wherein
the refined fat is palm fat and/or coconut oil.

6. The emulsion of claim 1,
wherein
said emulsion comprises a viscosity of between 1 mPas and 10 mPas at a temperature of 20° C.

7. The emulsion of claim 1,
wherein
said emulsion comprises a pH value of >6.5.

8. The emulsion of claim 1,
wherein
said emulsion comprises a pH value of >7.5.

9. The emulsion of claim 1,
wherein
the plant fat is present in the emulsion with a D90 particle size of <5 μm.

10. The emulsion of claim 1,
wherein
said emulsion comprises a mass fraction of water which is >87%.

11. The emulsion of claim 1,
wherein
said emulsion additionally comprises any selected from the group consisting of: sugars, flavours, viscosity-influencing carbohydrates, acid-regulating phosphates, minerals and vitamins.

12. A lupine protein emulsion prepared by a method comprising:
mixing a lupine protein with water and plant fat to form an emulsion, which is heated to a temperature of >95° C. and then cooled down, wherein plant fat particles in the emulsion form a D90 particle size of less than 5 μm from mechanical energy of the mixing process, wherein a mass fraction of the lupine protein in the emulsion is <3%, and
wherein
a mass fraction in the lupine protein of alpha and beta conglutine is ≥80% and a mass fraction of gamma conglutine is between 1 and 10%, and
wherein
an amount of deposited solids from the resulting lupine protein emulsion is less than 10% of the solid contained in the emulsion after storage for 10 days at 4° C.

* * * * *